United States Patent [19]
Dugas et al.

[11] Patent Number: 5,395,205
[45] Date of Patent: Mar. 7, 1995

[54] PART LOADING APPARATUS HAVING HARMONICALLY DRIVEN SHUTTLE AND PIVOTAL PART SUPPORTING FRAME

[75] Inventors: Michael R. Dugas, Brighton; Patric J. Kenny, Framington Hills; Keith A. Oldford, Howell, all of Mich.

[73] Assignee: Progressive Tool & Industries, Southfiled, Mich.

[21] Appl. No.: 112,679

[22] Filed: Aug. 26, 1993

[51] Int. Cl.6 .......................... B66C 23/00; B25J 5/02
[52] U.S. Cl. .................... 414/728; 414/724; 414/773; 414/779; 414/782
[58] Field of Search ............... 414/728, 742, 743, 773, 414/758, 778, 779, 782, 783, 917

[56] References Cited
U.S. PATENT DOCUMENTS

| 3,286,854 | 11/1966 | Crawford . | |
|---|---|---|---|
| 3,967,723 | 7/1976 | Beckham | 198/235 |
| 4,368,815 | 1/1983 | Kvasnicka | 198/413 |
| 4,411,586 | 10/1983 | Zitser et al. | 414/728 |
| 4,533,291 | 8/1985 | Nishida | 414/728 |
| 4,991,707 | 2/1991 | Alexander et al. | 198/346.1 |
| 5,006,037 | 4/1991 | Bluemle | 414/771 |
| 5,042,287 | 8/1991 | Sartorio | 72/422 |

Primary Examiner—Karen B. Merritt
Attorney, Agent, or Firm—Bastile and Hanlon

[57] ABSTRACT

A part loading apparatus is disclosed for transporting a workpiece from a first position generally in a first plane to a second position generally in a second plane for transfer to another work station. The part loading apparatus includes a rail for transporting the workpiece between the first and second positions. A shuttle is disposed on the rail for reciprocally moving between the first and second positions. A drive motor is provided for harmonically driving the shuttle between the first and second positions, wherein the shuttle decelerates when approaching the first and second positions, and accelerates when leaving the first and second positions. A frame carries the workpiece from the first position to the second position and is supported on the shuttle for pivotal movement from the first plane to the second plane while the shuttle moves between the first and second positions.

20 Claims, 3 Drawing Sheets

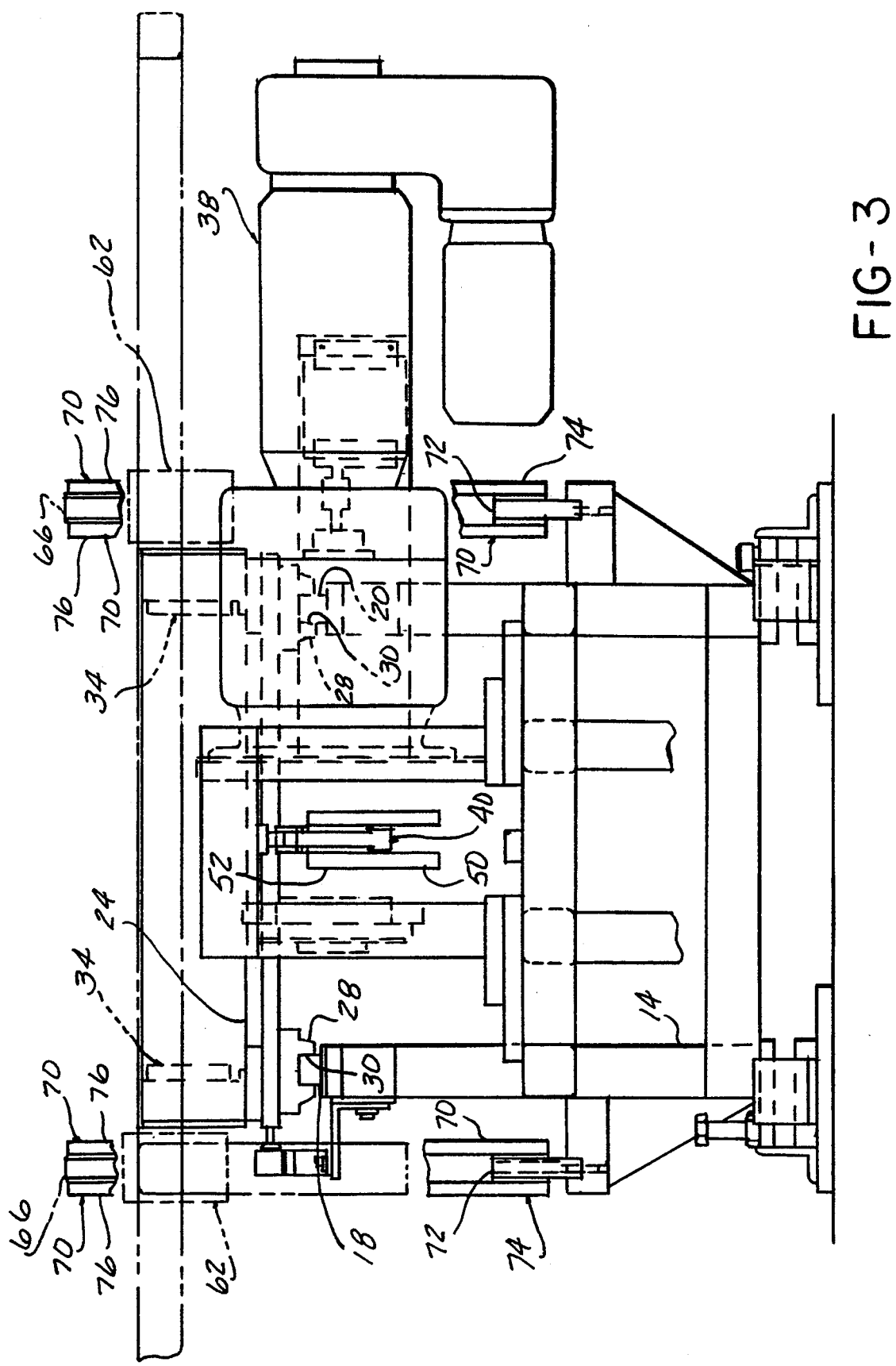

PART LOADING APPARATUS HAVING HARMONICALLY DRIVEN SHUTTLE AND PIVOTAL PART SUPPORTING FRAME

FIELD OF THE INVENTION

The present invention is directed to a part loading apparatus employed to handle parts for attachment to panel-like articles, such as the main body panel components which are to be subsequently assembled as a unitized vehicle body, to successively load parts at a framing and welding station or the like.

BACKGROUND OF THE INVENTION

In the assembly of a unitized body, the first step in the assembly or the framing of the body brings together at the first framing station on the body assembly production line various major panels, locates the panels in assembled relationship with each other and, while the panels are so located, robotic welders weld the panels to each other to form a vehicle body shell. Typically, the first step in the framing process will involve a vehicle body floor panel, right and left-hand side panels, a fire wall panel and a roof panel or roof header members extending transversely between the upper portions of the body side panels. Once the panels are assembled to each other at the first framing station, access to a portion of the individual panels at the interior of the body shell becomes restricted, and it is thus conventional practice to perform several preassembly steps on the individual panels before they are advanced to the framing station. In the case of a body side panel, for example, the panel is initially stamped from sheet metal, and is then advanced through a series of work stations where additional parts, such as door latch and hinge reinforcements, mounting brackets, stiffeners, etc., are welded in place on the sheet metal stamping.

Prior known devices include a conveyor for conveying a body side panel to a series of work stations where the pre-framing operations referred to above are performed on the body side panel. The conveying system includes a carrier mounted for movement along an elevated horizontal path extending past a series of work stations. A generally rectangular open support frame is mounted along one edge upon the carrier for pivotal movement relative to the carrier about a horizontal axis parallel to the conveying path. While the carrier is being advanced from one work station to the next, the support frame is maintained in a horizontal elevated position well clear of the plant floor. The body side panel, during this transfer step, is held against the underside of the support frame by what will be referred to generally as a plurality of clamps. Upon arrival at a work station, the carrier is stopped and a manipulator associated with the conveyor pivots the support frame downwardly to a vertically inclined or vertical position relative to the carrier to locate the body side panel in an adjacent relationship with a stationary panel receiving work frame at the work station. The panel is transferred from the stationary work frame and the support frame is then pivoted back upwardly to its horizontal position clear of the panel on the work frame. After the work operations have been performed on the panel while the panel is held on the stationary work frame, the support frame is again pivoted downwardly, the panel is reclamped to the support frame, and the support frame with the panel is then pivoted back upwardly to its horizontal position relative to the carrier for advancement to the next work station.

Most, if not all, of these work stations are automated, and automated assembly of this type requires a precise positioning of the panel relative to the automated equipment so that the various parts are precisely located on the panel. Achievement of such alignment and access to the desired locations on the panel by the assembly tooling cannot always be achieved while the panel is supported on the conveyor, and at the typical work station, a stationary work frame especially designed to support the panel in alignment with the tooling is employed to support the panel while the particular assembly of operation is performed. This in turn involves a transfer of the panel from the conveyor to the work frame to perform the assembly operation and the subsequent transfer of the panel back from the work frame to the conveyor after the operation is completed.

To accomplish such a transfer, a transfer device must be accurately aligned both with the conveyor and with the work frame upon which the body panel was positioned in alignment with the automated tooling. In that the typical conveyor will extend for 100 feet or more and includes several work stations, precise alignment of all portions of the conveying path with a fixed reference point is difficult to achieve in practice. Insofar as the path of movement of parts or panels along the conveyor is concerned, precise positioning is of little concern during transit of the panels between successive work stations. However, at arrival at a work station, the panel must be precisely positioned relative to the transfer mechanism which in turn must be precisely positioned relative to the work frame.

Once the major panel is precisely positioned relative to the stationary work frame, the part to be assembled to the body panel must be loaded and transferred to a precise position with respect to the body panel for subsequent assembly operations, such as welding. The present invention is directed to such a part loading device for transferring parts from a first position generally disposed in a first plane to a second position generally disposed in a second plane precisely positioned relative to the body panel and the stationary work frame. The part is taken from a conveying path, or is manually loaded, for loading and transfer by the present invention to assure proper placement of the part on the stationary work frame within the desired degree of precision. The present invention providing soft touch operation as the present invention reaches the end limit of travel in either direction.

SUMMARY OF THE INVENTION

The present invention discloses a part loading apparatus for moving a workpiece from a first position generally in a first plane to a second position generally in a second plane for transfer to another work station, such as a stationary work station holding another workpiece for relative placement with respect to one another and for performing an assembly process thereon. The part loading apparatus of the present invention preferably includes rail means for transporting the workpiece between the first and second positions. Shuttle means is disposed on the rail means for reciprocally moving between the first and second positions. Drive means harmonically drives the shuttle means in such a manner that it decelerates when approaching the first and second positions, and accelerates when leaving the first and second positions. Frame means carries the workpiece from the first position to the second position. The frame means is supported on the shuttle means for pivotal movement from the first plane to the second plane while the shuttle means is moving between the first and second positions. The part loading apparatus of the present invention can also include part support means for holding the workpiece relative to the frame means while moving between the first and second planes.

The drive means can include a motor for driving a crank arm in rotation between a first angular position and a second angular position. Driven link means connect the crank arm to the shuttle means for translating rotary motion of the crank arm into harmonic linear motion of the shuttle means.

The frame means can include an elongated frame pivotally connected to the shuttle means between first and second ends for movement between the first and second planes. The frame can have part support means adjacent the first end. Anchored link means connects the second end of the frame to a stationary point, such that as the shuttle means is driven between the first and second positions, the frame is simultaneously driven between the first and second planes.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 3 is an end view of the part loading apparatus shown in FIG. 1.

DETAILED DESCRIPTION OF THE PREFERRED EMBODIMENT

The part loading apparatus 10 of the present invention is particularly well-suited for use in combination with a body side panel handling conveyor such as that disclosed in commonly-owned U.S. Pat. No. 4,991,707, whose disclosure is incorporated herein by reference. In that patent, a panel carrier is mounted for movement along a fixed conveying path defined by a pair of conveyor rails. The carrier includes a main carrier frame mounted on the two conveyor rails as by rollers for longitudinal movement only relative to the rails. A panel support frame is mounted on the main carrier frame for pivotal movement relative to the main frame about an axis extending parallel to the rails. The panel support frame includes a rigidly mounted rail gripping device which engages one of the two conveyor rails, and when so engaged, locates the panel support frame in a panel conveying position.

At a work station, that conveying rail upon which the rail gripping member of the panel support frame rides is formed with a relatively short gap which is normally bridged by a relatively short movable rail section which constitutes part of a manipulator employed to pivot the panel support frame from its normally assumed conveying position to a transfer position in which a panel carried by the panel support frame engages a stationary work frame at the work station so that support of the panel may be transferred from the panel support frame to or from the stationary work frame 12.

Figure 1:
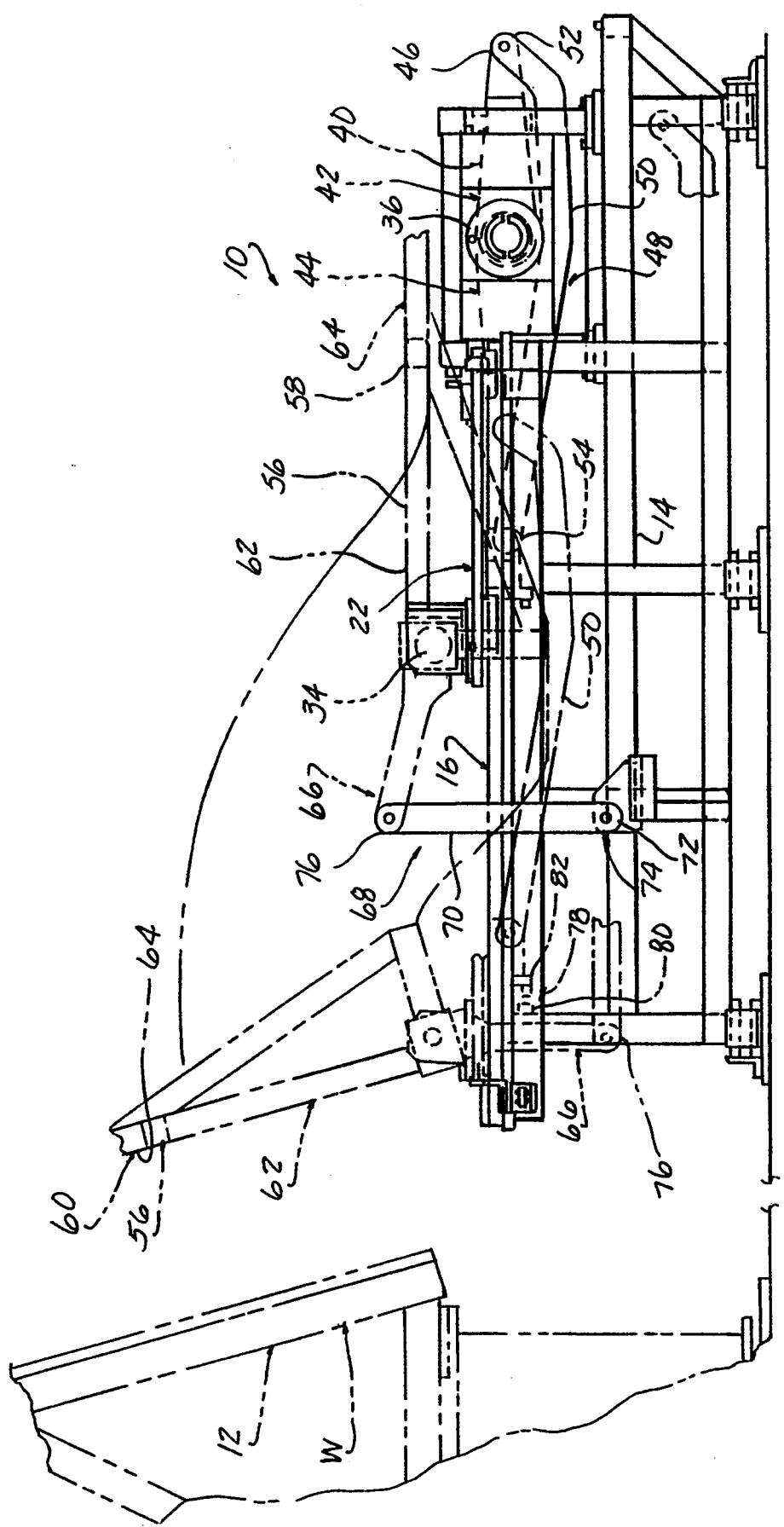
FIG. 1 is a side elevational view of a part loading apparatus according to the present invention.

In FIG. 1 there is shown a side elevational view of a single work station W of an automotive body side panel assembly line. The purpose of this particular line is to assemble on the stamped sheet metal body side panel various additional parts, such as door lock and hinge reinforcements, mounting brackets, etc. before the panel is fed into a subsequent line where the side panel is assembled to the floor panel, roof panel, etc. to form a unitized vehicle body. By preassembling the various parts to the side panel before the side panel is assembled into the body, access to the desired part locations on the side panel is greatly facilitated, which is an important consideration where automated tooling is employed.

Only a single work station is shown in FIG. 1. The part loading apparatus 10 of the present invention being duplicated at the remaining work station. Typically, a body side panel subassembly line will have six or more work stations.

Figure 2:
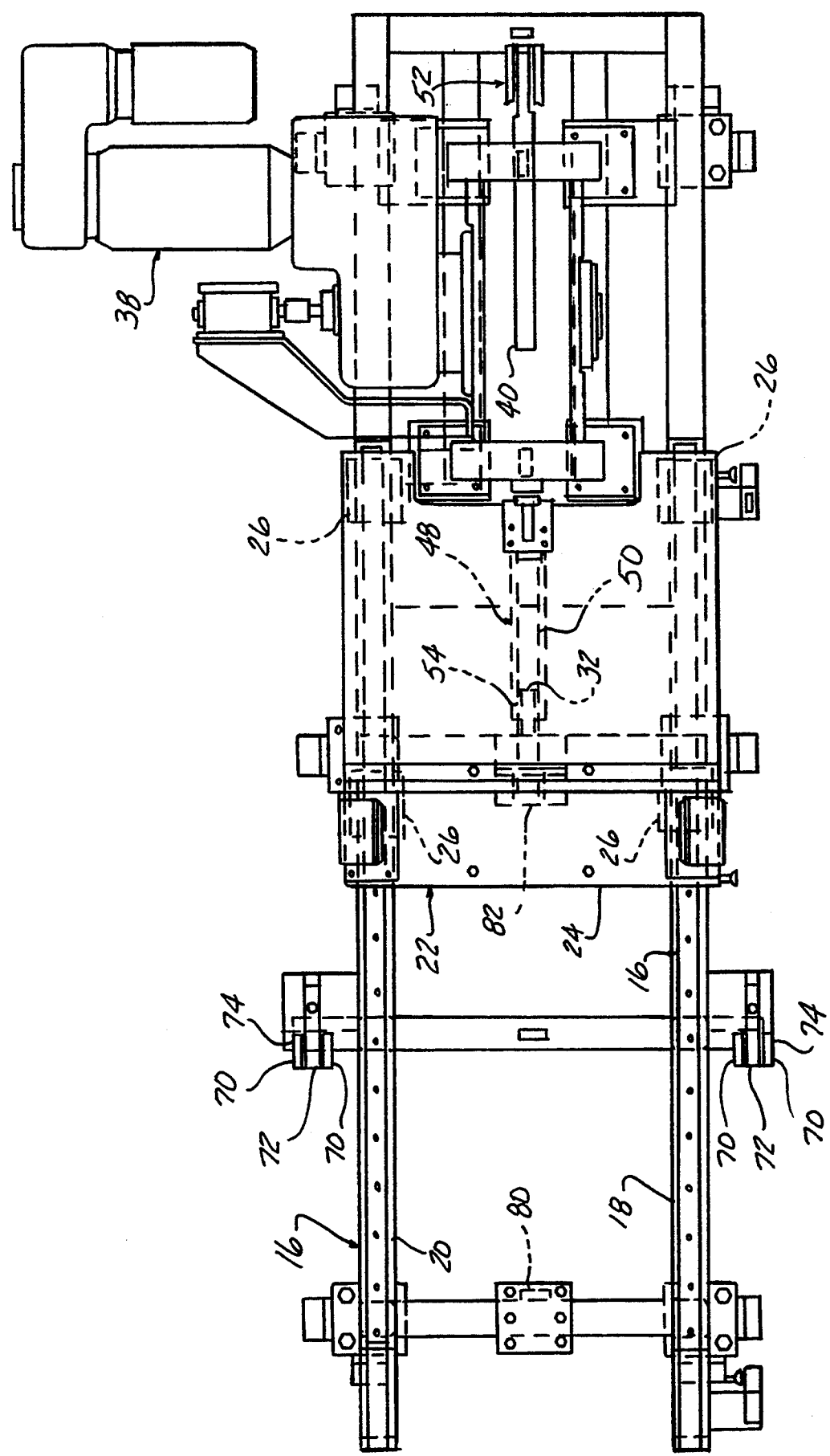
FIG. 2 is a plan view of the part loading apparatus shown in FIG. 1.

The part loading apparatus 10 shown in the drawings includes a fixed frame 14 on which the rail means 16 is fixedly mounted. The rail means 16 can include at least one rail 18 extending between a first position, such as a work station for loading a desired part onto the part loading apparatus 10, and a second position, such as a work station W at which various types of automated tooling, such as a robotic welder are located. In the embodiment illustrated in FIGS. 1-3, the rail means 16 includes a first rail 18 and a second rail 20. The dual rail configuration being desirable in the case of larger size parts to provide greater stability. The rail means 16 defining a fixed conveying path for transporting a workpiece or part between the first and second positions.

Shuttle means 22 is mounted on the rail means 16 for reciprocally moving between the first and second positions. The shuttle means 22 moves longitudinally along the conveying path defined by the rail means 16. The shuttle means 22 can include a generally planar member 24 with at least one rail engaging means 26 for supporting the planar member 24 from the rail means 16 for longitudinal movement along the conveying path. The rail engaging means 26 may include a slide member 28 having an aperture or slot 30 formed therein complimentary in shape to the rail means 16 for sliding engagement with the rail means 16. The planar member 24 having a link connection 32 disposed thereon, and in addition, the planar member 24 further having a pivot connection 34 connected thereto.

Drive means 36 is connected to the fixed frame 14 for harmonically driving the shuttle means 22 between the first and second positions. The shuttle means is driven in a manner so that the shuttle means 22 decelerates when approaching the first and second positions and accelerates when leaving the first and second positions. The drive means 36 can include a motor means 38 for driving a crank arm 40 in rotation between a first angular position 42 and a second angular position 44 shown in phantom. The motor means 38 preferably is a reversible motor, such as an electric motor or hydraulic motor, for driving a spindle in rotation through 180° between the first angular position 42 and the second angular position 44. The crank arm 40 is connected to the spindle of the motor means 38, such as by splines or a key and keyway connection. The crank arm extends radially outwardly from the rotational axis of the spindle of the motor means 38. The crank arm 40 is connected at its radially outer end 46 to driven link means 48. The driven link means 48 connects the crank arm to the shuttle means 22 and translates rotary motion of the crank arm 40 into harmonic linear motion of the shuttle means 22. The driven link means 48 can include an elongated first link 50 having a first end 52 connected to the radially outward end 46 of the crank arm 40 and a second end 54 connected to the link connection 32 on the planar member 24 of the shuttle means 22. The translation of the rotary motion into harmonic linear motion also provides a soft touch type operation, where the shuttle means 22 decelerates as it approaches the first position at one end of the rail means 16 and also decelerates as it approaches the second position at the opposite end of the rail means 16. When leaving the first or second position, the shuttle means 22 accelerates to a point approximately midway between the first and second positions, and thereafter decelerates.

Frame means 56 is provided for carrying the workpiece P from the first position to the second position. The frame means 56 is supported on the shuttle means 22 for pivotal movement from a first plane 58 to a second plane 60 (shown in phantom) while the shuttle means 22 moves between the first and second positions. The frame means 56 can take a variety of shapes and forms depending on the workpiece to be transferred and loaded with respect to the stationary work frame 12. The frame means 56 is pivotally connected to the planar member 24 through pivot connection 34. If required, a plurality of pivot connections 34 can be provided in order to sufficiently stabilize the frame means with respect to the planar member 24. The frame means 56 can include an elongated frame 62 pivotally connected to the shuttle means 22 between a first end 64 and a second end 66. The frame 62 includes part support means 84 adjacent the first end 64. The part support means 84 may include a part supporting surface adjacent the first end. Anchored link means 68 connects the second end 66 of the frame 62 to a stationary point, such as pivot connection 72 on fixed frame 14. The anchored link means 68 can include an elongated second link 70 having a first end 74 connected to the stationary pivot connection 72 of the fixed frame 14 and a second end 76 connected to the second end 66 of the pivotal frame 62. The anchored link means 68 for transforming linear motion of the shuttle means 22 into pivotal movement of the frame means 56. As the shuttle means 22 is driven between the first and second positions, the frame 62 is driven between the first and second planes.

Stop means 78 is provided for preventing over travel of the shuttle means 22 beyond the first and second positions. The stop means 78 can include an over travel stop plate 80 and plate-engaging projection 82. The plate 80 may be connected to fixed frame 14 while the projection 82 is connected to the shuttle means 22.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

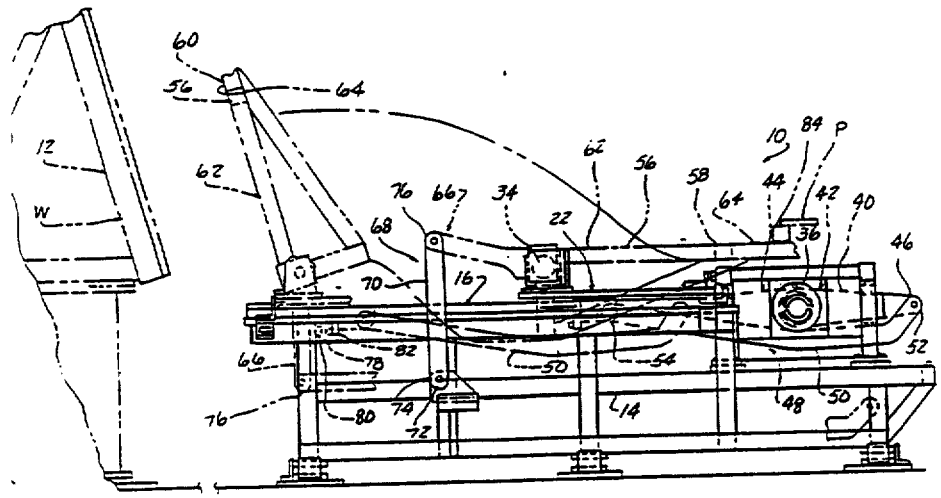

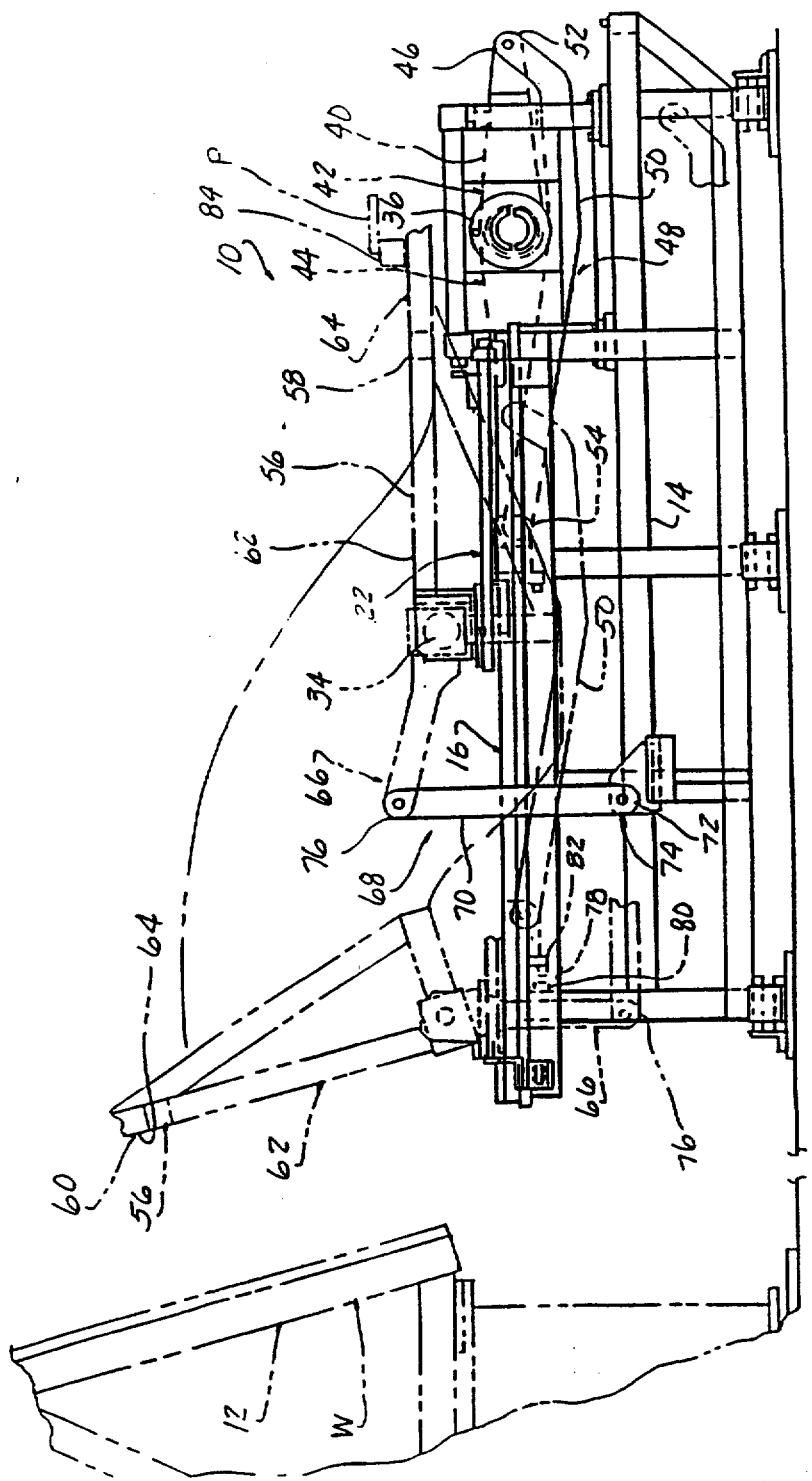

What is claimed is:

1. A part loading apparatus for moving a workpiece from a first position to a second position, while moving said workpiece from generally a first plane to generally a second plane for transfer to a work station comprising:
   rail means for transporting said workpiece between said first and second positions;
   shuttle means disposed on said rail means for reciprocally moving between said first and second positions;
   drive means for harmonically driving said shuttle means between said first and second positions, wherein said shuttle means decelerates when approaching said first and second positions, and accelerates when leaving said first and second positions;
   frame means for carrying said workpiece from said first position to said second position, said frame means supported on said shuttle means for pivotal movement from said first plane to said second plane while said shuttle means moves between said first and second positions; and
   anchored link means for connecting said frame means to a stationary point such that as said shuttle means is driven between said first and second positions, said frame means is driven between said first and second planes.

2. The apparatus of claim 1 further comprising:
   part support means for holding said workpiece relative to said frame means while moving between said first and second planes.

3. The apparatus of claim 1 wherein said drive means further comprises:
   motor means for driving a crank arm in rotation between a first angular position and a second angular position; and
   driven link means for connecting said crank arm to said shuttle means for translating rotary motion of said crank arm into harmonic linear motion of said shuttle means.

4. The apparatus of claim 3 further comprising said first angular position approximately 180° from said second angular position.

5. The apparatus of claim 3 wherein said motor means further comprises:
   a reversible motor capable of rotating a spindle through at least 180° of motion, said crank arm connected to said spindle for rotation therewith.

6. The apparatus of claim 3 wherein said driven link means further comprises:
   an elongated link having a first end pivotally connected to said crank arm and a second end pivotally connected to said shuttle means.

7. A part loading apparatus for moving a workpiece from a first position to a second position, while moving said workpiece from generally a first plane to generally a second plane for transfer to a work station comprising:
   rail means for transporting said workpiece between said first and second positions;
   shuttle means disposed on said rail means for reciprocally moving between said first and second positions;
   drive means for harmonically driving said shuttle means between said first and second positions, wherein said shuttle means decelerates when approaching said first and second positions, and accelerates when leaving said first and second positions; and
   frame means for carrying said workpiece from said first position to said second position, said frame means supported on said shuttle means for pivotal movement from said first plane to said second plane while said shuttle means moves between said first and second positions, wherein said frame means further includes an elongated frame pivotally connected to said shuttle means between first and second ends for movement between said first and second planes, said frame having part support means adjacent said first end, and anchored link means for connecting said second end of said frame to a stationary point such that as said shuttle means is driven between said first and second positions, said frame is driven between said first and second planes.

8. The apparatus of claim 7 wherein said anchored link means further comprises:
an elongated link having a first end pivotally connected to a stationary point and a second end pivotally connected to said second end of said frame for translating linear movement of said shuttle means into pivotal movement of said frame.

9. A part loading apparatus for moving a workpiece from a first position to a second position, while moving said workpiece from generally a first plane to generally a second plane for transfer to a work station comprising:
rail means for transporting said workpiece between said first and second positions;
shuttle means disposed on said rail means for reciprocally moving between said first and second positions, wherein said shuttle means includes a generally planar member having at least one rail-engaging means for supporting the planar member from the rail means, the planar member having a link connection and a pivot connection disposed thereon;
drive means for harmonically driving said shuttle means between said first and second positions, wherein said shuttle means decelerates when approaching said first and second positions, and accelerates when leaving said first and second positions; and
frame means for carrying said workpiece from said first position to said second position, said frame means supported on said shuttle means for pivotal movement from said first plane to said second plane while said shuttle means moves between said first and second positions.

10. The apparatus of claim 9 wherein said rail-engaging means further comprises:
a slide having an aperture complementary in shape to said rail means for sliding engagement with said rail means for supporting said planar member with respect to said rail means.

11. A part loading apparatus for moving a workpiece from a first position to a second position, while moving said workpiece from generally a first plane to generally a second plane for transfer to a work station comprising:
rail means for transporting said workpiece between said first and second positions;
shuttle means disposed on said rail means for reciprocally moving between said first and second positions;
rotary motion drive means for driving said shuttle means between said first and second positions, wherein said shuttle means decelerates when approaching said first and second positions, and accelerates when leaving said first and second positions;
driven link means for connecting said drive means to said shuttle means for translating rotary motion of said drive means into harmonic linear motion of said shuttle means;
frame means for carrying said workpiece from said first position to said second position, said frame means supported on said shuttle means for pivotal movement from said first plane to said second plane while said shuttle means moves between said first and second positions; and
anchored link means for connecting said frame means to a stationary point for translating linear motion of said shuttle means into pivotal motion of said frame means such that as said shuttle means is driven between said first and second positions, said frame means is driven between said first and second planes.

12. The apparatus of claim 11 wherein said frame means further comprises:
an elongated frame pivotally connected to said shuttle means between first and second ends for movement between said first and second planes, said frame having part support means adjacent said first end.

13. The apparatus of claim 11 further comprising:
part support means for holding said workpiece relative to said frame means while moving between said first and second planes.

14. The apparatus of claim 11 wherein said rotary drive means further comprises:
motor means for driving a crank arm in rotation between a first angular position and a second angular position.

15. The apparatus of claim 14 further comprising said first angular position approximately 180° from said second angular position.

16. The apparatus of claim 14 wherein said motor means further comprises:
a reversible motor capable of rotating a spindle through at least 180° of motion, said crank arm connected to said spindle for rotation therewith.

17. The apparatus of claim 14 wherein said driven link means further comprises:
an elongated link having a first end pivotally connected to said crank arm and a second end pivotally connected to said shuttle means.

18. The apparatus of claim 11 wherein said shuttle means further comprises:
a generally planar member having at least one rail-engaging means for supporting the planar member from the rail means, the planar member having a link connection and a pivot connection disposed thereon.

19. The apparatus of claim 18 wherein said rail-engaging means further comprises:
a slide having an aperture complementary in shape to said rail means for sliding engagement with said rail means for supporting said planar member with respect to said rail means.

20. A part loading apparatus for moving a workpiece from a first position to a second position, while moving said workpiece from generally a first plane to generally a second plane for transfer to a work station comprising:
at least one rail for transporting said workpiece between said first and second positions;
a shuttle disposed on said rail for reciprocally moving between said first and second positions;

a drive for harmonically driving said shuttle between said first and second positions, wherein said shuttle decelerates when approaching said first and second positions, and accelerates when leaving said first and second positions, said drive including a reversible motor for driving a crank arm in rotation between a first angular position and a second angular position;

a driven link for connecting said crank arm to said shuttle for translating rotary motion of said crank arm into harmonic linear motion of said shuttle;

an elongated part-supporting frame for carrying said workpiece from said first position to said second position, said frame supported on said shuttle for pivotal movement from said first plane to said second plane while said shuttle moves between said first and second positions, said frame pivotally connected to said shuttle between first and second ends for movement between said first and second planes;

an anchored link for connecting said second end of said frame to a stationary point for translating linear movement of said shuttle into pivotal movement of said frame such that as said shuttle is driven between said first and second positions, said frame is driven between said first and second planes; and part support means adjacent said first end of said frame for holding said workpiece relative to said frame while moving between said first and second planes.

* * * * *

UNITED STATES PATENT AND TRADEMARK OFFICE
CERTIFICATE OF CORRECTION

PATENT NO.   : 5,395,205

DATED        : March 7, 1995

INVENTOR(S)  : Michael R. Dugas, et. al.

It is certified that error appears in the above-identified patent and that said Letters Patent is hereby corrected as shown below:

The Title page, showing an illustrative figure, should be deleted and substitute therefor the attached title page.

Delete Drawing Sheet 1, and subsititute thereof the Drawing Sheet 1 as shown on the attached page.

Signed and Sealed this

Twelfth Day of September, 1995

Attest:

BRUCE LEHMAN

Attesting Officer

Commissioner of Patents and Trademarks

United States Patent [19]

Dugas et al.

[11] Patent Number: 5,395,205
[45] Date of Patent: Mar. 7, 1995

[54] PART LOADING APPARATUS HAVING HARMONICALLY DRIVEN SHUTTLE AND PIVOTAL PART SUPPORTING FRAME

[75] Inventors: Michael R. Dugas, Brighton; Patric J. Kenny, Framington Hills; Keith A. Oldford, Howell, all of Mich.

[73] Assignee: Progressive Tool & Industries, Southfiled, Mich.

[21] Appl. No.: 112,679

[22] Filed: Aug. 26, 1993

[51] Int. Cl.6 .......................... B66C 23/00; B25J 5/02
[52] U.S. Cl. ................................. 414/728; 414/724; 414/773; 414/779; 414/782
[58] Field of Search ................. 414/728, 742, 743, 773, 414/758, 778, 779, 782, 783, 917

[56] References Cited

U.S. PATENT DOCUMENTS

| 3,286,854 | 11/1966 | Crawford . | |
|---|---|---|---|
| 3,967,723 | 7/1976 | Beckham | 198/235 |
| 4,368,815 | 1/1983 | Kvasnicka | 198/413 |
| 4,411,586 | 10/1983 | Zitser et al. | 414/728 |
| 4,533,291 | 8/1985 | Nishida | 414/728 |
| 4,991,707 | 2/1991 | Alexander et al. | 198/346.1 |
| 5,006,037 | 4/1991 | Bluemle | 414/771 |
| 5,042,287 | 8/1991 | Sartorio | 72/422 |

Primary Examiner—Karen B. Merritt
Attorney, Agent, or Firm—Bastile and Hanlon

[57] ABSTRACT

A part loading apparatus is disclosed for transporting a workpiece from a first position generally in a first plane to a second position generally in a second plane for transfer to another work station. The part loading apparatus includes a rail for transporting the workpiece between the first and second positions. A shuttle is disposed on the rail for reciprocally moving between the first and second positions. A drive motor is provided for harmonically driving the shuttle between the first and second positions, wherein the shuttle decelerates when approaching the first and second positions, and accelerates when leaving the first and second positions. A frame carries the workpiece from the first position to the second position and is supported on the shuttle for pivotal movement from the first plane to the second plane while the shuttle moves between the first and second positions.

20 Claims, 3 Drawing Sheets